(12) United States Patent
Strong

(10) Patent No.: US 11,743,402 B2
(45) Date of Patent: Aug. 29, 2023

(54) SYSTEM AND METHOD FOR PHOTO SUBJECT DISPLAY OPTIMIZATION

(71) Applicant: SMUGMUG, INC., Mountain View, CA (US)

(72) Inventor: Brian Strong, San Jose, CA (US)

(73) Assignee: AWES.ME, INC., Mountain View, CA (US)

( * ) Notice: Subject to any disclaimer, the term of this patent is extended or adjusted under 35 U.S.C. 154(b) by 0 days.

(21) Appl. No.: 16/722,293

(22) Filed: Dec. 20, 2019

(65) Prior Publication Data

US 2020/0128145 A1 Apr. 23, 2020

Related U.S. Application Data

(63) Continuation-in-part of application No. 15/042,711, filed on Feb. 12, 2016, now abandoned.

(60) Provisional application No. 62/116,259, filed on Feb. 13, 2015.

(51) Int. Cl.
*H04N 1/00* (2006.01)
*G06T 3/20* (2006.01)

(52) U.S. Cl.
CPC ........... *H04N 1/00458* (2013.01); *G06T 3/20* (2013.01); *H04N 1/00183* (2013.01)

(58) Field of Classification Search
CPC .................................................. G06F 3/04845
USPC ......................................................... 715/781
See application file for complete search history.

(56) References Cited

U.S. PATENT DOCUMENTS

| 5,555,369 A * | 9/1996 | Menendez ................. G06F 8/34 |
| | | 715/788 |
| 5,963,670 A * | 10/1999 | Lipson .................... G06V 20/35 |
| | | 707/E17.025 |
| 6,282,317 B1 * | 8/2001 | Luo ......................... G06T 11/60 |
| | | 382/203 |

(Continued)

FOREIGN PATENT DOCUMENTS

| JP | 2007122101 A | * | 5/2007 | ........... G06K 9/3233 |
| WO | WO 2021/127656 | | 6/2021 | |

OTHER PUBLICATIONS

F. Perronnin and C. Dance, "Fisher Kernels on Visual Vocabularies for Image Categorization," 2007 IEEE Conference on Computer Vision and Pattern Recognition, 2007, pp. 1-8, doi: 10.1109/CVPR.2007.383266. (Year: 2007).*

(Continued)

*Primary Examiner* — Daniel Rodriguez
(74) *Attorney, Agent, or Firm* — POLSINELLI LLP

(57) ABSTRACT

A software application platform which provides a user with the ability to customize, via the uploading of digital photographs, the displayable area of a digital photo in an image gallery such that the photo subject for each digital photo is viewable within the image gallery on a graphical user interface is disclosed. Photos, each having a first aspect ratio, uploaded to an image gallery may be processed by the application such that the photo subject and the photo subject area of each digital photo is identified and positioned within an individual display window, each display window having a second aspect ratio, such that the display window displays the photo subject area in an image gallery on a graphical user interface. The application allows for customization to the look and feel of an image gallery while maintaining a display of the photo subject area.

19 Claims, 11 Drawing Sheets

(56) References Cited

U.S. PATENT DOCUMENTS

| | | | |
|---|---|---|---|
| 6,344,907 B1 | 2/2002 | Watanabe et al. | |
| 6,654,506 B1* | 11/2003 | Luo | G06V 10/25 |
| | | | 345/620 |
| 7,162,102 B2* | 1/2007 | Cahill | G06T 11/00 |
| | | | 382/284 |
| 7,237,185 B1* | 6/2007 | Sequeira | H04N 21/23424 |
| | | | 348/E7.071 |
| 7,889,405 B2* | 2/2011 | Takami | H04N 1/00453 |
| | | | 358/1.9 |
| 8,135,684 B2 | 3/2012 | Fedorovskaya et al. | |
| 8,392,538 B1 | 3/2013 | Lee | |
| 8,438,478 B2* | 5/2013 | Takami | H04N 1/00411 |
| | | | 715/274 |
| 8,983,142 B1* | 3/2015 | Zhang | G06F 16/954 |
| | | | 382/111 |
| 9,578,188 B1* | 2/2017 | Kircher | H04N 23/632 |
| 9,836,831 B1* | 12/2017 | Krishnaswamy | G06T 5/50 |
| 9,996,904 B2 | 6/2018 | Goldberg et al. | |
| 10,284,842 B2 | 5/2019 | Ramasubramonian et al. | |
| 11,436,272 B2* | 9/2022 | Jing | G06F 16/3326 |
| 2002/0030634 A1* | 3/2002 | Noda | H04N 1/387 |
| | | | 345/5 |
| 2002/0114535 A1* | 8/2002 | Luo | H04N 1/3875 |
| | | | 382/282 |
| 2002/0135621 A1* | 9/2002 | Angiulo | G06F 16/958 |
| | | | 707/E17.116 |
| 2003/0093759 A1* | 5/2003 | Narusawa | G06K 15/02 |
| | | | 715/246 |
| 2004/0218832 A1* | 11/2004 | Luo | H04N 1/6027 |
| | | | 382/167 |
| 2005/0025387 A1* | 2/2005 | Luo | H04N 1/3875 |
| | | | 382/173 |
| 2005/0104897 A1* | 5/2005 | Walker | H04N 1/3873 |
| | | | 345/620 |
| 2005/0114784 A1* | 5/2005 | Spring | G06F 16/954 |
| | | | 715/202 |
| 2005/0147298 A1 | 7/2005 | Gallagher et al. | |
| 2005/0268227 A1* | 12/2005 | Carlson | G06F 40/186 |
| | | | 715/223 |
| 2006/0064716 A1* | 3/2006 | Sull | G06F 16/784 |
| | | | 715/201 |
| 2006/0187241 A1* | 8/2006 | Boler | G06T 11/60 |
| | | | 345/660 |
| 2006/0188173 A1* | 8/2006 | Zhang | H04N 7/0122 |
| | | | 348/E5.111 |
| 2006/0197963 A1* | 9/2006 | Royal | G06T 11/60 |
| | | | 358/1.2 |
| 2007/0204209 A1* | 8/2007 | Truelove | G06F 16/4393 |
| | | | 715/203 |
| 2008/0055616 A1* | 3/2008 | Scott | H04N 1/62 |
| | | | 358/1.9 |
| 2008/0065606 A1* | 3/2008 | Boys | G06F 16/5838 |
| 2008/0182635 A1* | 7/2008 | Chiu | A63F 13/45 |
| | | | 463/9 |
| 2009/0034842 A1* | 2/2009 | Grosvenor | H04N 1/3872 |
| | | | 382/173 |
| 2009/0067718 A1 | 3/2009 | Shingai | |
| 2009/0091633 A1* | 4/2009 | Tamaru | H04N 23/61 |
| | | | 348/208.14 |
| 2009/0147297 A1* | 6/2009 | Stevenson | G06T 11/60 |
| | | | 358/1.15 |
| 2009/0208118 A1* | 8/2009 | Csurka | G06V 20/10 |
| | | | 382/228 |
| 2009/0263038 A1* | 10/2009 | Luo | G06F 18/23213 |
| | | | 382/254 |
| 2009/0295789 A1* | 12/2009 | Yao | G06T 3/00 |
| | | | 345/418 |
| 2010/0048242 A1* | 2/2010 | Rhoads | G06V 10/56 |
| | | | 455/556.1 |
| 2010/0226564 A1* | 9/2010 | Marchesotti | G06F 16/51 |
| | | | 382/159 |
| 2010/0302393 A1 | 12/2010 | Olsson et al. | |
| 2011/0016419 A1 | 1/2011 | Grosz et al. | |
| 2011/0221764 A1* | 9/2011 | Callens | G06F 9/451 |
| | | | 345/620 |
| 2011/0235910 A1* | 9/2011 | Soceanu | G06V 40/173 |
| | | | 382/173 |
| 2011/0305397 A1* | 12/2011 | Piramuthu | G06T 3/00 |
| | | | 382/199 |
| 2012/0082401 A1 | 4/2012 | Berger et al. | |
| 2012/0093214 A1* | 4/2012 | Urbach | G06F 40/143 |
| | | | 375/E7.026 |
| 2012/0127329 A1* | 5/2012 | Voss | H04N 23/6811 |
| | | | 348/208.4 |
| 2012/0148165 A1 | 6/2012 | Yabu | |
| 2012/0275701 A1* | 11/2012 | Park | G06T 7/11 |
| | | | 382/173 |
| 2012/0294514 A1* | 11/2012 | Saunders | G06V 20/30 |
| | | | 382/218 |
| 2013/0055087 A1* | 2/2013 | Flint | G11B 27/34 |
| | | | 715/723 |
| 2013/0108164 A1* | 5/2013 | Ptucha | G06V 40/161 |
| | | | 382/195 |
| 2013/0207994 A1* | 8/2013 | Rodeski | G06F 16/957 |
| | | | 345/593 |
| 2013/0223740 A1* | 8/2013 | Wang | G06T 7/143 |
| | | | 382/173 |
| 2013/0235346 A1* | 9/2013 | Huang | A61B 3/152 |
| | | | 351/208 |
| 2014/0072221 A1* | 3/2014 | Sakai | H04N 23/64 |
| | | | 382/173 |
| 2014/0096013 A1* | 4/2014 | Grosz | G06F 3/1205 |
| | | | 715/733 |
| 2014/0136962 A1* | 5/2014 | Fischer | G06T 7/0002 |
| | | | 715/250 |
| 2014/0193047 A1 | 7/2014 | Grosz et al. | |
| 2014/0195921 A1* | 7/2014 | Grosz | G06F 3/1205 |
| | | | 715/738 |
| 2014/0254865 A1* | 9/2014 | Soubra | G06V 20/653 |
| | | | 382/103 |
| 2014/0340409 A1* | 11/2014 | Murphy-Chutorian | G06T 7/97 |
| | | | 345/473 |
| 2014/0354768 A1* | 12/2014 | Mei | H04N 23/70 |
| | | | 348/222.1 |
| 2015/0055824 A1* | 2/2015 | Hong | G06V 10/255 |
| | | | 382/103 |
| 2015/0103079 A1* | 4/2015 | Khambanonda | G06T 11/60 |
| | | | 345/441 |
| 2015/0103092 A1* | 4/2015 | Khambanonda | G06F 40/106 |
| | | | 345/593 |
| 2015/0116350 A1* | 4/2015 | Lin | G06N 20/10 |
| | | | 345/620 |
| 2015/0117783 A1* | 4/2015 | Lin | G06T 7/162 |
| | | | 382/195 |
| 2015/0117784 A1* | 4/2015 | Lin | G06T 11/60 |
| | | | 382/195 |
| 2015/0169572 A1* | 6/2015 | Taubman | G06F 16/5854 |
| | | | 707/723 |
| 2015/0227817 A1* | 8/2015 | Lin | G06V 20/10 |
| | | | 382/170 |
| 2015/0277825 A1* | 10/2015 | Isobe | G06F 3/122 |
| | | | 358/1.18 |
| 2015/0293672 A1* | 10/2015 | Crotty | G06T 11/60 |
| | | | 715/833 |
| 2015/0339394 A1* | 11/2015 | Jinq | G09B 19/00 |
| | | | 715/776 |
| 2016/0042381 A1* | 2/2016 | Braine | G06Q 30/0215 |
| | | | 705/14.17 |
| 2016/0189343 A1* | 6/2016 | Chen | G06V 10/40 |
| | | | 382/195 |
| 2016/0239188 A1 | 8/2016 | Strong | |
| 2016/0295104 A1* | 10/2016 | An | H04N 23/632 |
| 2017/0018106 A1* | 1/2017 | Chevet | G06T 7/73 |
| 2017/0083762 A1* | 3/2017 | Segalovitz | G06T 3/4007 |
| 2019/0213420 A1 | 7/2019 | Karyodisa et al. | |

(56) References Cited

U.S. PATENT DOCUMENTS

2020/0014603 A1 1/2020 Kuo et al.
2020/0304754 A1* 9/2020 Huynh Thien ....... G11B 27/031

OTHER PUBLICATIONS

Machine Translation of JP 2007122101 A published on May 17, 2007, 12 pages (Year: 2007).*
PCT Application No. PCT/US2020/066479 International Search Report and Written Opinion dated Feb. 27, 2021.
U.S. Appl. No. 15/042,711 Office Action dated Jun. 26, 2019.
U.S. Appl. No. 15/042,711 Final Office Action dated Mar. 21, 2019.
U.S. Appl. No. 15/042,711 Office Action dated Oct. 2, 2018.
U.S. Appl. No. 15/042,711 Final Office Action dated Jun. 14, 2018.
U.S. Appl. No. 15/042,711 Office Action dated Dec. 1, 2017.
PCT Application No. PCT/US2020/066479 International Preliminary Report on Patentability dated May 17, 2022.

* cited by examiner

800 →

810 — RECEIVE A SELECTION OF A GALLERY DISPLAY SCHEME WHEREIN THE GALLERY DISPLAY SCHEME COMPRISES ONE OR MORE DISPLAY WINDOWS EACH COMPRISING ONE OR MORE FIRST ASPECT RATIOS

820 — RECEIVE ONE OR MORE DIGITAL PHOTOS HAVING ONE OR MORE SECOND ASPECT RATIOS

830 — IDENTIFY A PHOTO SUBJECT FOR EACH DIGITAL PHOTO

840 — IDENTIFY A PHOTO SUBJECT AREA FOR EACH DIGITAL PHOTO DEFINED BY THE PHOTO SUBJECT OF EACH DIGITAL PHOTO

850 — POSITION THE PHOTO SUBJECT AREA OF EACH DIGITAL PHOTO WITHIN THE ONE OR MORE DISPLAY WINDOWS SUCH THAT EACH DISPLAY WINDOW DISPLAYS THE PHOTO SUBJECT OF ONE DIGITAL PHOTO, AND WHEREIN THE PHOTO AREA IS DISPLAYED WITHIN THE DISPLAY WINDOW REGARDLESS OF THE ONE OR MORE FIRST ASPECT RATIOS

860 — DISPLAY THE DISPLAY WINDOWS IN A GALLERY ON A GRAPHICAL USER INTERFACE

*Fig. 8*

SYSTEM AND METHOD FOR PHOTO SUBJECT DISPLAY OPTIMIZATION

CROSS-REFERENCE TO RELATED APPLICATIONS

This application is a continuation-in-part of U.S. Non-Provisional application Ser. No. 15/042,711, filed Feb. 12, 2016, which claims benefit of U.S. Provisional Patent Application No. 62/116,259, filed Feb. 13, 2015, the entirety of which are both herein incorporated by reference.

BACKGROUND

Field

Embodiments of the present disclosure generally relate to the field of computer software. More specifically, embodiments provided herein relate to a system and method for generating and applying a photo subject display to an image gallery on a graphical user interface.

Description of the Related Art

The production and availability of information and media has gained prevalence in today's society. The ability to instantly access and share information, experiences, news, photos, and videos over the internet has revolutionized the way people connect, learn, consume information, and participate in today's society.

In recent years, the popularity of personal web pages that are hosted by web service providers has increased. Examples of such personal web pages include profile pages on social network websites, personal blog web pages, personal online photo galleries, and the like. There exists a strong connection between a user and their personal web pages that has lead web page service providers to enable their customers to customize the look and feel of their personal web pages. For example, some web service providers allow web page users to upload photos that are displayed on their personal web pages, and/or allow web page users to edit the font size and typeface displayed on their personal web pages. Some web service providers further enable web page users to create a sharable photo gallery in which only select portions of the available photos are displayed on the gallery web page and seen on a graphical user interface, until the photo is selected by a user redirecting the user to a new web page.

One popular approach of modifying the viewable portion of a photo in a photo gallery on a user interface element involves the user manually selecting one or more areas of the photo, such as by cropping the photo such that the desired area of the photo is remains viewable. However, a large number of user interface elements are typically included in even the simplest of personal web pages; therefore, the manual selection process quickly becomes cumbersome. Moreover, a majority of individuals do not understand the complexities involved with photo editing, and what is aesthetically pleasing, which results in web page users conducting a trial-and-error process that further contributes to the burdensome task of customizing a personal web page. Additionally, a photo subject may be left out of view in the viewable portion of a photo in a photo gallery which may inhibit the viewing experience of a photo gallery web page.

As the foregoing illustrates, there is a need for an improved technique for applying a photo subject display to an image gallery on a graphical user interface, such as that displayed from a personal web page. More specifically, what is needed in the art is a photo subject display application.

SUMMARY

The present disclosure generally relates to a software application platform which provides a user with the ability to customize, via the uploading of digital photographs in their original aspect ratio, the displayable area of a digital photo in an image gallery such that the photo subject for each digital photo is viewable within the image gallery on a graphical user interface. Photos, each having a first aspect ratio, uploaded to an image gallery may be displayed by the application such that the photo subject and the photo subject area of each digital photo is identified and positioned within an individual display window, each display window having a second aspect ratio, such that the display window displays the photo subject area in an image gallery on a graphical user interface. A user may select the display window to further view the photo in the second aspect ratio. The display windows allow for customization to the look and feel of an image gallery (e.g., maintaining uniformity or promoting uniqueness), such as the size or shape of photos displayed, while maintaining a display of the photo subject area.

In one embodiment, a method for analyzing and applying a photo subject display to an image is disclosed. The method includes receiving a selection of a gallery display scheme wherein the gallery display scheme comprises one or more display windows. Each display window may comprise one or more first aspect ratios. The method further includes receiving one or more digital photos having one or more second aspect ratios. Furthermore, the method includes identifying a photo subject for each of the one or more digital photos, and identifying a photo subject area for each of the one or more digital photos defined by the photo subject of each of the one or more digital photos. The method also includes positioning the photo subject area of each of the one or more digital photos within the one or more display windows such that each display window displays the photo subject area of one of the one or more digital photos, and wherein the photo subject area is displayed within the display window regardless of the one or more first aspect ratios. The method also includes displaying the display windows in a gallery on a graphical user interface.

In another embodiment, a computer system for analyzing and applying a photo subject display to an image is disclosed. The computer system for analyzing and applying a photo subject display to an image may include a processor and a memory storing instructions that, when executed by the processor, cause the computer system receive a selection of a gallery display scheme wherein the gallery display scheme comprises one or more display windows. Each display window may comprise one or more first aspect ratios. The computer system may further receive one or more digital photos having one or more second aspect ratios. Furthermore, the computer system may identify a photo subject for each of the one or more digital photos, and identify a photo subject area for each of the one or more digital photos defined by the photo subject of each of the one or more digital photos. The computer system may also position the photo subject area of each of the one or more digital photos within the one or more display windows such that each display window displays the photo subject area of one of the one or more digital photos, and wherein the photo subject area is displayed within the display window regardless of the one or more first aspect ratios. The computer system also may display the display windows in a gallery on a graphical user interface.

In yet another embodiment, a non-transitory computer-readable medium, storing instructions that, when executed by a processor, cause a computer system to analyze and apply a photo subject display to an image is provided. The processor may perform the steps of receiving a selection of a gallery display scheme wherein the gallery display scheme comprises one or more display windows. Each display window may comprise one or more first aspect ratios. The processor may further perform the step of receiving one or more digital photos having one or more second aspect ratios. The processor may also perform the steps of identifying a photo subject for each of the one or more digital photos, and identifying a photo subject area for each of the one or more digital photos defined by the photo subject of each of the one or more digital photos. Furthermore, the processor may perform the step of positioning the photo subject area of each of the one or more digital photos within the one or more display windows such that each display window displays the photo subject area of one of the one or more digital photos, and wherein the photo subject area is displayed within the display window regardless of the one or more first aspect ratios. The processor may also perform the step of displaying the display windows in a gallery on a graphical user interface.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 8 schematically illustrates operations of a method for applying a photo subject display operation according to one embodiment described herein.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Embodiments described herein generally relate to the display of photo subjects and an application which receives a selection of a gallery display scheme comprising one or more display windows, analyzes, identifies, determines, assigns, selects, positions, generates, applies, and displays a photo subject area containing a photo subject within each of the display windows within an image gallery on a graphical user interface. For example, a webpage may store various digital photographs in an image gallery such that the digital photographs can be accessed by a computing device upon request by a user or an application. The application may automatically analyze, identify, and determine a photo subject and a photo subject area of each image displayed within the image gallery on the graphical user interface connected to the computing device in order to apply and display a display window comprising the photo subject area containing the photo subject to the image gallery as displayed on the graphical user interface.

The term "user" as used herein includes, for example, a person or entity that owns a computing device or wireless device; a person or entity that operates or utilizes a computing device or a wireless device; or a person or entity that is otherwise associated with a computing device or a wireless device. It is contemplated that the term "user" is not intended to be limiting and may include various examples beyond those described.

The term "image" as used herein includes, for example, messages, photos, videos, blogs, advertisements, notifications, and various other types of media which may be visually consumed by a user. It is contemplated that the term "image" is not intended to be limiting and may include various examples beyond those described.

The term "display window" as used herein includes, for example, a custom graphical appearance package achieved by the use of a graphical user interface that can be applied to computer software, operating systems, websites, and the like in order to suit the purpose, topic, or tastes of different users without affecting the functionality of the interface. The term "display window" may include, but is not limited to, the area containing the primary subject of an image or text as displayed on a webpage and as viewed on a graphical user interface. The display window may be viewed as representing a portion of a larger image, or the entire image, such that the main subject or idea of the full image may be grasped and is intended to make it easier, faster, and/or visually cohesive to look at or manage a group of images (e.g., those in an image gallery) on a webpage in order to enhance the information displayed on the webpage. It is contemplated that the term "display window" is not intended to be limiting and may include various examples beyond those described.

Figure 1:
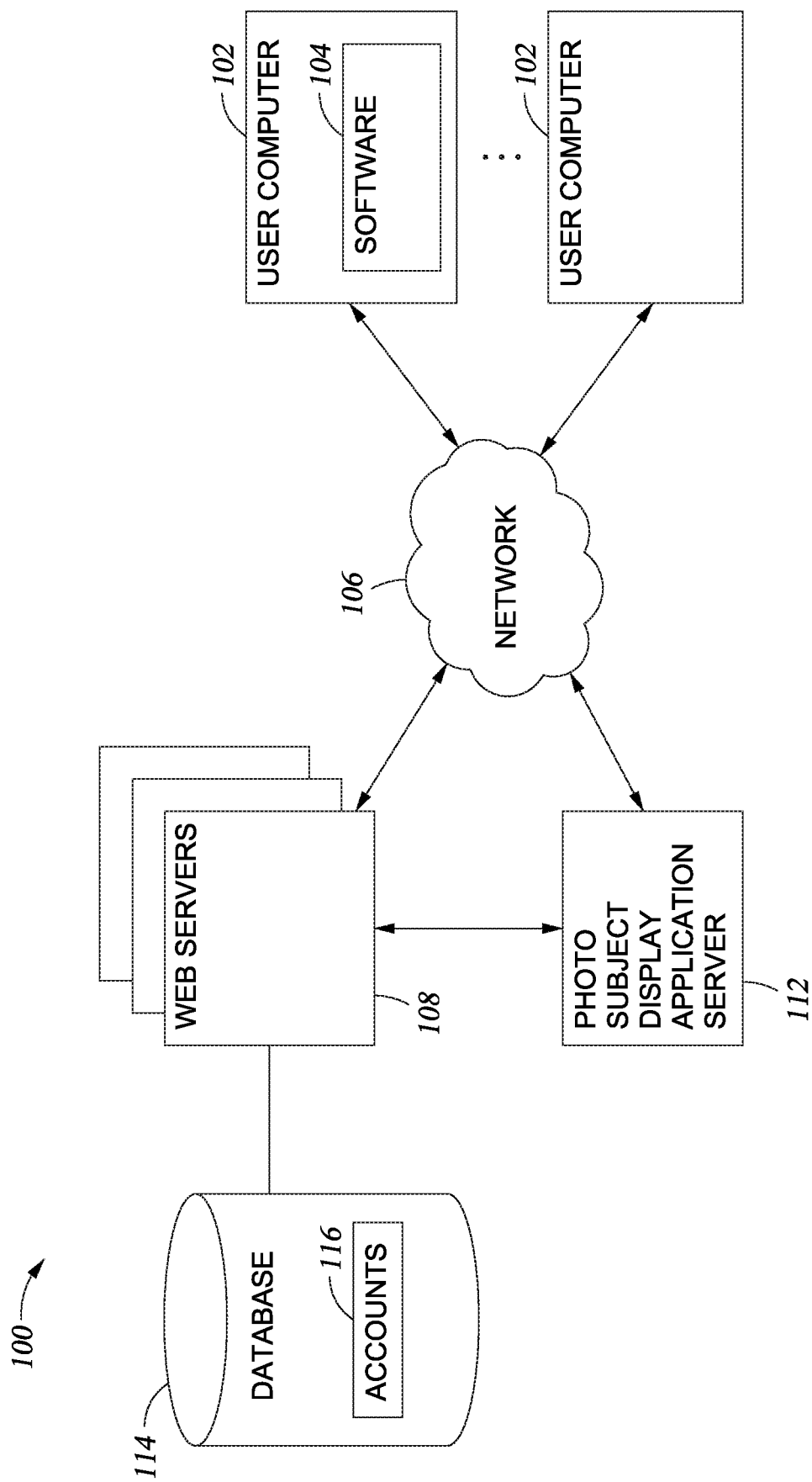
FIG. 1 illustrates a computer system configured for providing a website having a photo subject display application according to one embodiment described herein.

FIG. 1 illustrates a computing system 100 configured for providing a photo subject display application in which embodiments of the disclosure may be practiced. As shown, the computing system 100 may include a plurality of web servers 108, a photo subject display application server 112, and a plurality of user computers (i.e., mobile/wireless devices) 102 (only two of which are shown for clarity), each connected to a communications network 106 (for example, the Internet). The web servers 108 may communicate with the database 114 via a local connection (for example, a Storage Area Network (SAN) or Network Attached Storage (NAS)) or over the Internet (for example, a cloud based storage service). The web servers 108 are configured to either directly access data included in the database 114 or to interface with a database manager that is configured to manage data included within the database 114. An account 116 is a data object that stores data associated with a user, such as the user's email address, password, contact information, billing information, photo subject displays for his or her personal web page(s), and the like.

Each user computer 102 may include conventional components of a computing device, for example, a processor, system memory, a hard disk drive, a battery, input devices such as a mouse and a keyboard, and/or output devices such as a monitor or graphical user interface, and/or a combination input/output device such as a touchscreen which not only receives input but also displays output. Each web server 108 and the photo subject display application server 112 may include a processor and a system memory (not shown), and may be configured to manage content stored in database 114 using, for example, relational database software and/or a file system. The web servers 108 may be programmed to communicate with one another, user computers 102, and the photo subject display application server using a network protocol such as, for example, the TCP/IP protocol. The photo subject display application server 112 may communicate directly with the user computers 102 through the communications network 106. The user computers 102 are programmed to execute software 104, such as web browser programs and other software applications, and access web pages and/or applications managed by web servers 108 by specifying a uniform resource locator (URL) that directs to web servers 108.

In the embodiments described below, users are respectively operating the user computers 102 that are connected to the web servers 108 over the communications network 106. Web pages are displayed to a user via the user computers 102. The web pages are transmitted from the web servers 108 to the user's computer 102 and processed by the web browser program stored in that user's computer 102 for display through a display device and/or a graphical user interface in communication with the user's computer 102.

In one example, images displayed on the user's computer 102 may be a digital photograph accessed via an online photo gallery. The user's computer 102 may access the online photo gallery via the communications network 106 which, in turn, retrieves the online photo gallery from the web servers 108 connected to the database 114 and causes the images to be displayed through a graphical user interface of the user's computer 102. The online photo gallery may be managed with a username and password combination, or other similar restricted access/verification required access methods, which allow the user to "log in" and access the images.

It is noted that the user computer 102 may be a personal computer, laptop mobile computing device, smart phone, video game console, home digital media player, network-connected television, set top box, and/or other computing devices having components suitable for communicating with the communications network 106. The user computer 102 may also execute other software applications configured to receive image content and photo subject information from the photo subject display application, such as, but not limited to, image display software, media players, computer and video games, and/or widget platforms, among others.

Figure 2:
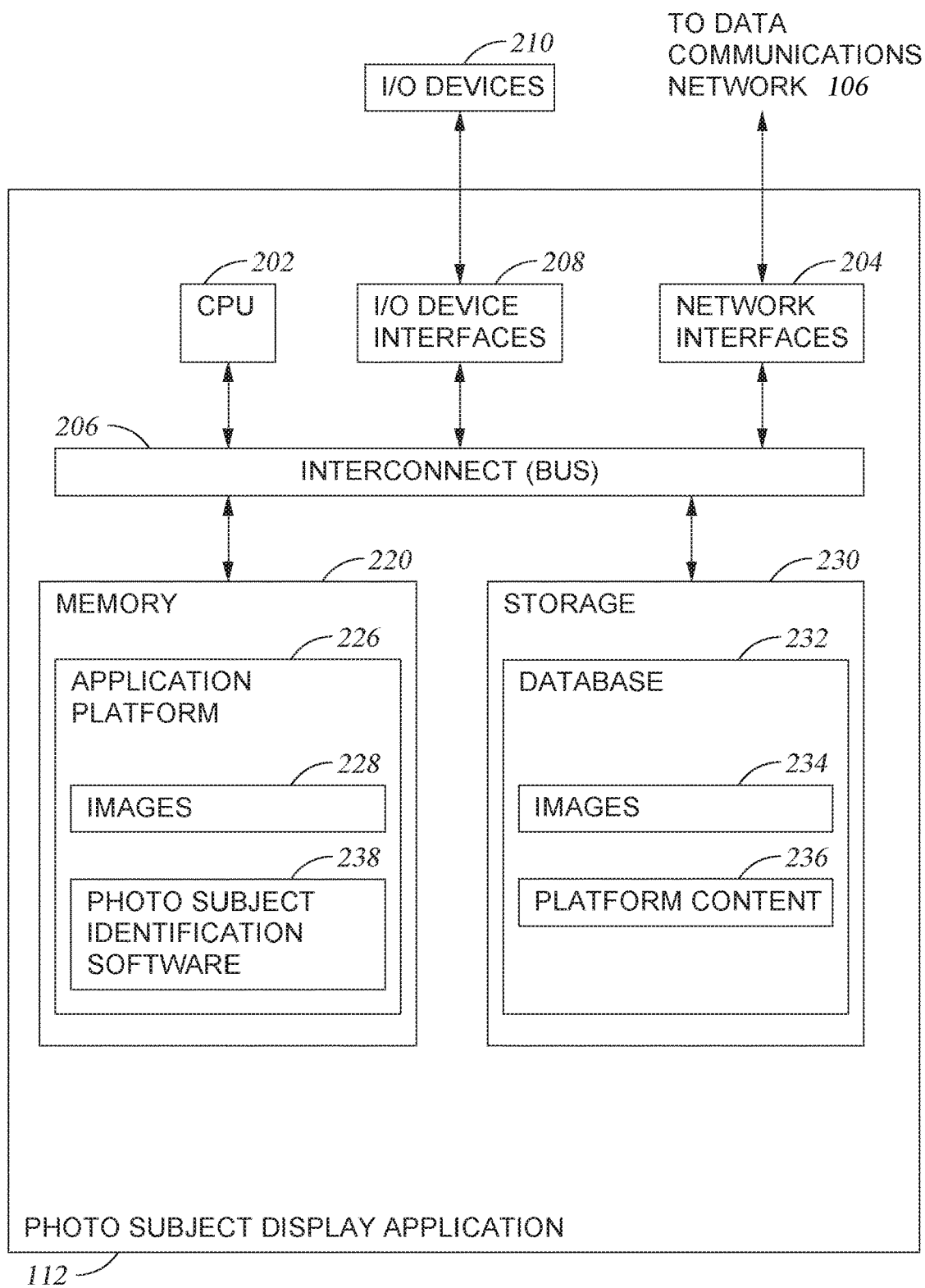
FIG. 2 illustrates a more detailed view of a server of FIG. 1 according to one embodiment described herein.

FIG. 2 illustrates a more detailed view of the photo subject display application server 112 of FIG. 1. The photo subject display application server 112 includes, without limitation, a central processing unit (CPU) 202, a network interface 204, memory 220, and storage 230 communicating via an interconnect 206. The photo subject display application server 112 may also include I/O device interfaces 208 connecting I/O devices 210 (for example, keyboard, video, mouse, audio, touchscreen, etc.). The photo subject display application 112 may further include the network interface 204 configured to transmit data via the communications network 106.

The CPU 202 retrieves and executes programming instructions stored in the memory 220 and generally controls and coordinates operations of other system components. Similarly, the CPU 202 stores and retrieves application data residing in the memory 220. The CPU 202 is included to be representative of a single CPU, multiple CPU's, a single CPU having multiple processing cores, and the like. The interconnect 206 is used to transmit programming instructions and application data between the CPU 202, I/O device interfaces 208, storage 230, network interfaces 204, and memory 220.

The memory 220 is generally included to be representative of a random access memory and, in operation, stores software applications and data for use by the CPU 202. Although shown as a single unit, the storage 230 may be a combination of fixed and/or removable storage devices, such as fixed disk drives, floppy disk drives, hard disk drives, flash memory storage drives, tape drives, removable memory cards, CD-ROM, DVD-ROM, Blu-Ray, HD-DVD, optical storage, network attached storage (NAS), cloud storage, or a storage area-network (SAN) configured to store non-volatile data.

The memory 220 may store instructions and logic for executing an application platform 226 which may include images 228 and/or photo subject identification software 238. The storage 230 may store images 234 and other user generated media and may include a database 232 configured to store images 234 associated with application platform content 236. The database 232 may also store application content relating to data associated with user generated media or images and other application features for providing the user with an application platform that displays images 234. The database 232 may be any type of storage device.

Network computers are another type of computer system that can be used in conjunction with the disclosures provided herein. Network computers do not usually include a hard disk or other mass storage, and the executable programs are loaded from a network connection into the memory 220 for execution by the CPU 202. A web TV system is also considered to be a computer system, but it may lack some of the features shown in FIG. 2, such as certain input or output devices. A typical computer system will usually include at least a processor, memory, and an interconnect coupling the memory to the processor.

Figure 3:
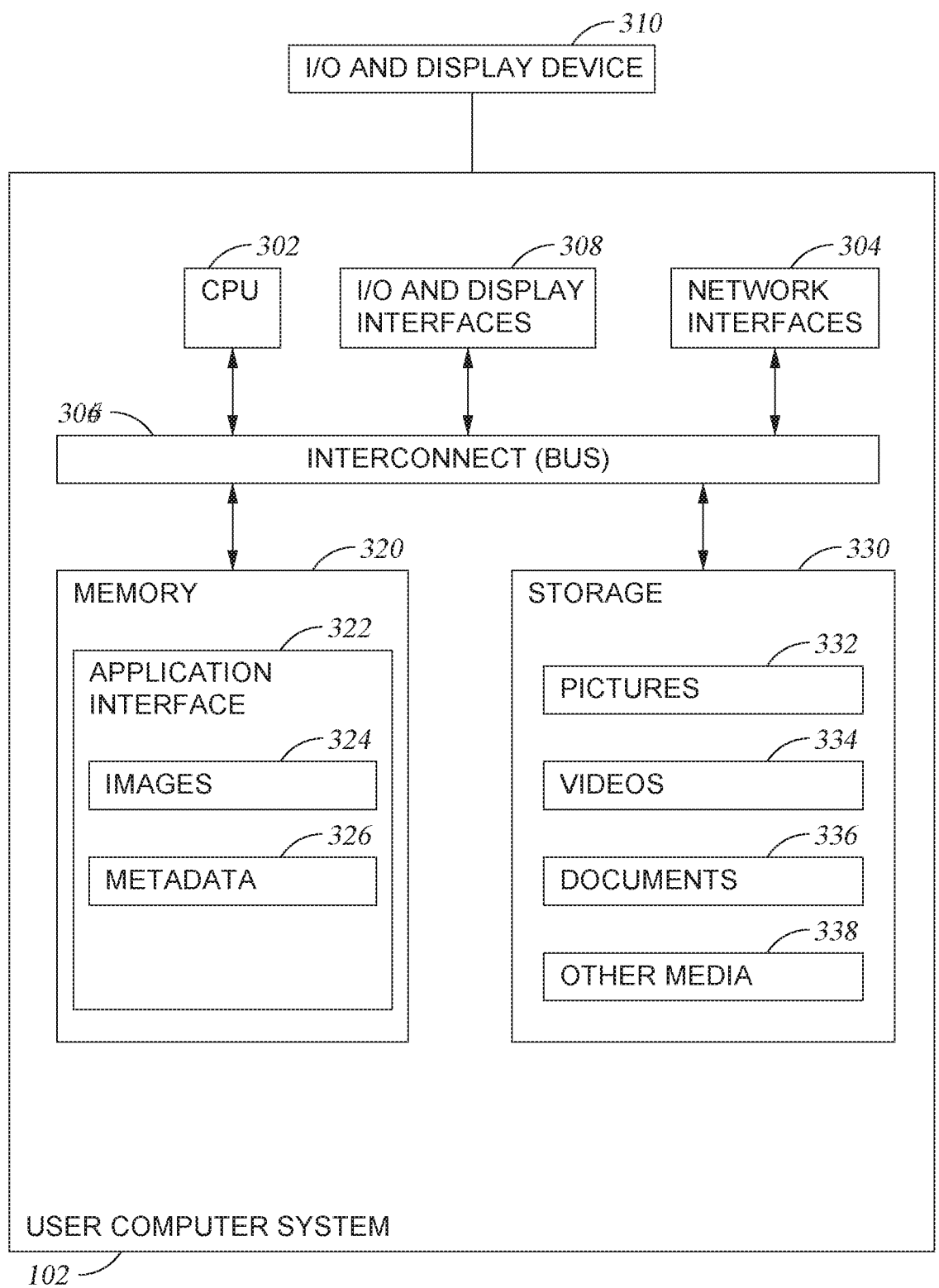
FIG. 3 illustrates a user computing system used to access a website and utilize the photo subject display application according to one embodiment described herein.

FIG. 3 illustrates a user computer 102 used to access the photo subject display application 112 and display images associated with the application platform 226. The user computer 102 may include, without limitation, a central processing unit (CPU) 302, a network interface 304, an interconnect 306, a memory 320, and storage 330. The user computer 102 may also include an I/O device interface 308 connecting I/O devices 310 (for example, keyboard, display, touchscreen, and mouse devices) to the user computer 102.

Like CPU 202, CPU 302 is included to be representative of a single CPU, multiple CPU's, a single CPU having multiple processing cores, etc., and the memory 320 is generally included to be representative of a random access memory. The interconnect 306 may be used to transmit programming instructions and application data between the CPU 302, I/O device interfaces 308, storage 330, network interface 304, and memory 320. The network interface 304 may be configured to transmit data via the communications network 106, for example, to stream content from the photo subject display application server 112. Storage 330, such as a hard disk drive or solid-state storage drive (SSD), may store non-volatile data. The storage 330 may contain pictures 332, videos 334, documents 336, and other media 338. Illustratively, the memory 320 may include an application interface 322, which itself may display images 324, and/or store metadata 326 of images 324. The application interface 322 may provide one or more software applications which allow the user to access media items and other content hosted by the photo subject display application server 112.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present example also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, flash memory, magnetic or optical cards, any type of disk including floppy disks, optical disks, CD-ROMs, and magnetic-optical disks, or any type of media suitable for storing electronic instructions, and each coupled to a computer system interconnect.

The algorithms and displays presented herein are not inherently related to any particular computer or other apparatus. Various general purpose systems may be used with programs in accordance with the teachings herein, or it may prove convenient to construct a more specialized apparatus to perform the required method operations. The structure for a variety of these systems will appear from the description above. In addition, the present examples are not described with reference to any particular programming language, and various examples may thus be implemented using a variety of programming languages.

As described in greater detail herein, embodiments of the disclosure provide a software application through which a user may customize an image gallery as displayed on a graphical user interface. The user may customize the image gallery via a selection of a gallery display scheme having one or more display windows. Each display window of the gallery display scheme may comprise one or more first aspect ratios. Furthermore, the software application may apply and display a photo subject area containing a photo subject within the selected display window based upon an analysis of the photo received by the software application. In particular, a gallery display scheme, or layout, containing one or more display windows each maintaining a first aspect ratio is received by the software application. Once the display scheme is received, one or more digital photographs having one or more second aspect ratios is received by the software application. At least one photo subject for each of the one or more digital photos is identified, and subsequently a photo subject area containing the photo subject is identified for each of the one or more digital photos. The photo subject area of each of the one or more digital photos is positioned within the one or more display windows such that each display window displays the photo subject area of one of the one or more digital photos such that the photo subject area is entirely displayed within the display window regardless of the one or more first or second aspect ratios. The display windows are displayed as defined by the gallery display scheme in an image gallery on a graphical user interface.

FIGS. 4A, 4B, 4C, and 4D, respectively, are conceptual diagrams illustrating applications of a centered frame display to a digital photo 400A, 400B, 400C, and 400D as uploaded to and received by the photo subject display application and prior to or executed simultaneously with photo subject detection and identification by the photo subject display application, according to embodiments described herein.

In the embodiments illustrated in FIGS. 4A, 4B, 4C, and 4D, the photo subject display application 112 receives a selection of a gallery display scheme. The gallery display scheme may be an order, a format, or a design in which images of a gallery are displayed and presented to a user of the image gallery in display windows. The gallery display scheme display windows may have a first aspect ratio (e.g., a square display window may maintain an aspect ratio of 1:1, a rectangular display window may maintain an aspect ratio of 3:2, etc.). Furthermore, the display windows may have an aspect ratio different than (e.g., greater than or less than) an aspect ratio of the one or more digital photos. Still further, the display windows may have an aspect ratio equal to an aspect ratio of the one or more digital photos. The photo subject display application 112 receives one or more digital photos, each digital photo having a second aspect ratio (the aspect ratio in which the photo was captured—e.g., 3:2, 7:5, etc.). For example, a gallery display scheme presents quadrilateral (e.g., square or rectangular) display windows for displaying images in five rows on a graphical user interface, each row having five display windows. In another example, a gallery display scheme presents triangular and/or circular display windows for displaying images in ten rows on a graphical user interface, each row having six images. Alternatively, by way of another example, a gallery display scheme may present display windows with aspect ratios identical to the aspect ratios of the digital photos display within, such that the entire digital photo is displayed within each display window.

As depicted in FIGS. 4A, 4B, 4C, and 4D, a square gallery display scheme has been selected by the user (see FIG. 5), and as such, a square display window 402A, 402B, 402C, or 402D is shown in phantom over the digital photos 400A, 400B, 400C, or 400D, respectively. Moreover, the digital photos 400A, 400B, 400C, and 400D may maintain their original aspect ratios, which may be an aspect ratio different than that of the display windows 402A, 402B, 402C, or 402D overlaid thereon. For example, the digital photos 400A, 400B, 400C, and 400D may maintain aspect ratios of 3:2, 7:5, etc.

In one embodiment, upon application of the centered frame display, the dimensions (e.g. height and width) of the display window 402A are determined and set based upon the dimensions of the digital photo 400A to be displayed therein and the aspect ratio for the display window 402A selected by the user when selecting a gallery display scheme. In the embodiment illustrated in 4A, the initial height $H_{W0}$ of the display window 402A has a value of zero, represented by a single dashed line. The initial width $W_{W0}$ of the display window 402A, however, is set to match (e.g., correspond with) the width $W_{P0}$ of the digital photo 400A. In this embodiment, the length of the final height $H_{WF}$ of the display window 402A is determined by converting the selected aspect ratio from the gallery display scheme into a percentage of the height relative to the width, and multiplying that percentage by the value of initial width $W_{W0}$. Thereafter, the Initial Height $H_{W0}$ of the Display Window 402A is adjusted to the determined length of the final height $H_{WF}$. For example, if the user selects a 3:1 (3w:1h) aspect ratio (e.g., a panoramic photo), the final height of $H_{WF}$ of the display window 402A is calculated to be 33% of the width $W_{W0}$ (1h/3w*100). Accordingly, the initial height $H_{W0}$ is then adjusted to the determined length equal to 33% of the width $W_{W0}$, resulting in the final height $H_F$.

Figure 4A:
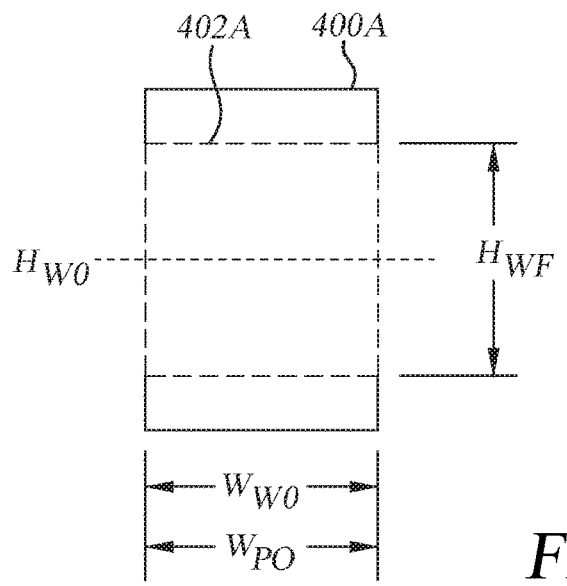
FIG. 4A illustrates a first conceptual diagram of applying a centered frame display to a digital photo, according to embodiments described herein.
Figure 4B:
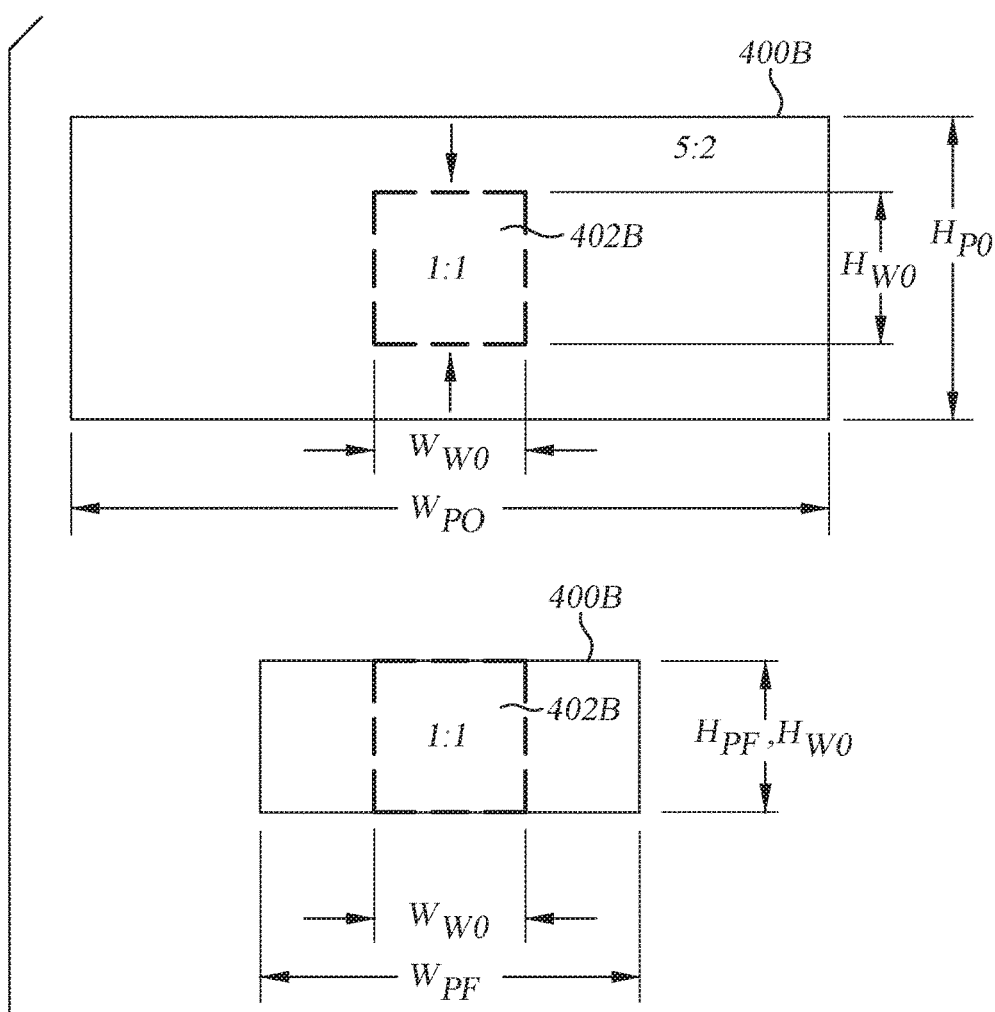
FIG. 4B illustrates a second conceptual diagram of applying a centered frame display to a digital photo, according to embodiments described herein.
Figure 4C:
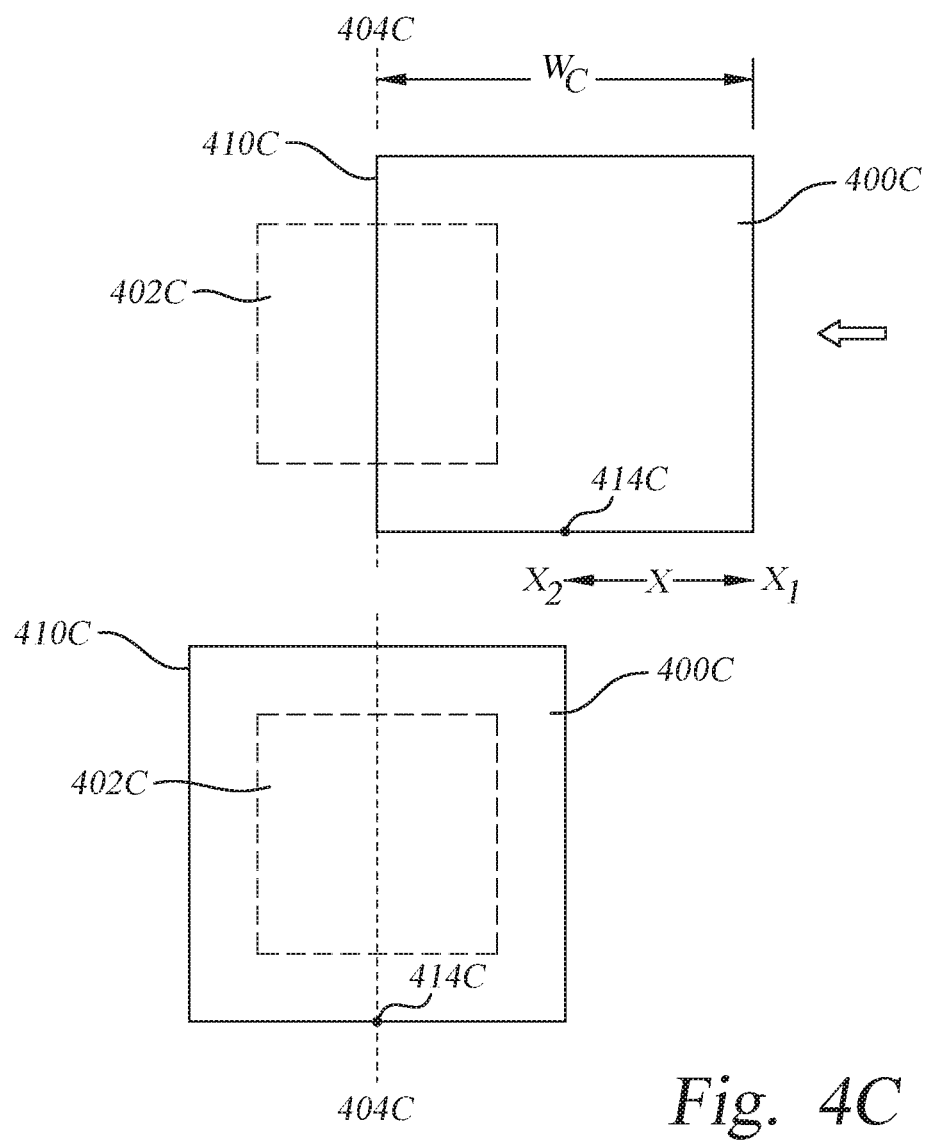
FIG. 4C illustrates a third conceptual diagram of applying a centered frame display to a digital photo, according to embodiments described herein.
Figure 4D:
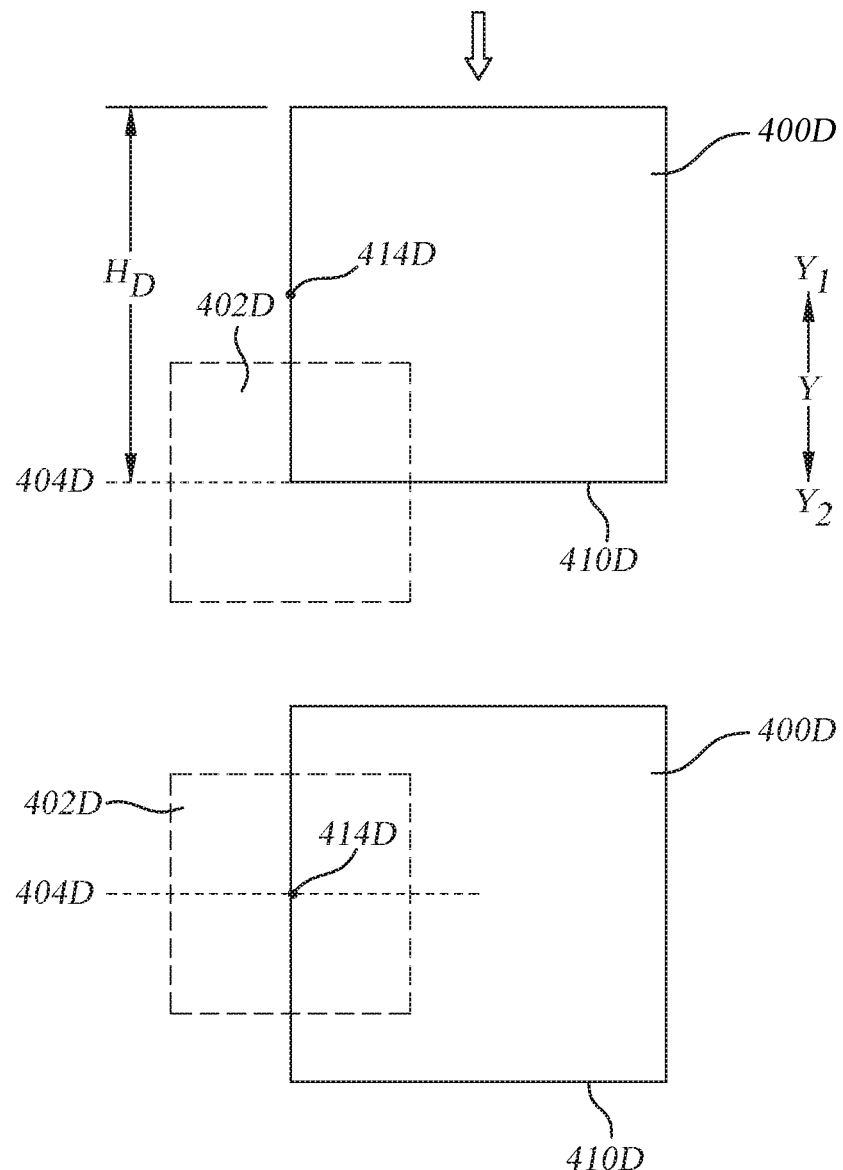
FIG. 4D illustrates a fourth conceptual diagram of applying a centered frame display to a digital photo, according to embodiments described herein.

In the embodiment illustrated in FIG. 4B, upon application of the centered frame display, the dimensions of the digital photo 400B are determined and adjusted based upon the dimensions of the display window 402B and the aspect ratio of the display window 402B relative to the aspect ratio of the digital photo 400B. In the embodiment illustrated in 4B, the aspect ratio of the display window 402B is first compared to the aspect ratio of the digital photo 400B to determine the magnitude of difference (e.g., delta) between each dimension (e.g., width and height) in the aspect ratio of the display window 402B and the aspect ratio of the digital photo 400B. The dimension of the digital photo 400B having the lesser magnitude of difference (e.g., smaller delta) with the corresponding dimension of the display window 402B is then set to match that dimension of the display window 402B. For example, as illustrated in FIG. 4B, the initial aspect ratio of the digital photo 400B is 5:2 (width:height) and the selected aspect ratio of the display window 402B is 1:1. As a result, the initial height $H_{P0}$ of the digital photo 400B is set to match the height $H_{W0}$ of the display window 402B while still maintaining its initial 5:2 aspect ratio. Accordingly, the final width $W_{PF}$ of the digital photo 400B exceeds the initial width $W_{W0}$ of the display window 402B, and thus the digital photo 400B "overflows" the display window 402B horizontally upon application of the centered frame display.

In addition to determining the dimensions of the display window and/or digital photo, the application of the centered frame display may apply a centering logic to the digital photo. For example, the digital photo may be absolutely positioned within the display window and then centered horizontally and/or vertically behind the display window, such that horizontal and/or vertical midpoints of the digital photo are aligned with horizontal and/or vertical midpoints of the display window. For example, for a digital photo 400C that will be centered horizontally, the digital photo 400C is first positioned behind (e.g., under) the display window 402C such that a vertical edge 410C of the digital photo 400C is aligned with a horizontal midpoint 404C of the display window 402C. The horizontal midpoint 404C is located halfway across (e.g., at a point 50% along a total length of) a horizontal axis X of the display window 402C. Upon alignment of the vertical edge 410C with the horizontal midpoint 404C, the digital photo 400C may be shifted along the horizontal axis X a total distance equal to 50% of a width $W_C$ of the digital photo 400C such that a horizontal midpoint 414C of the digital photo 400C is horizontally centered within the display window 402C. For example, if the digital photo 400C has a width $W_C$ of 10, the digital photo 400C is horizontally shifted in either a first or second direction $X_1$ or $X_2$, respectively, along the horizontal axis X by a distance of 5.

Similarly, for a digital photo 400D that will be centered vertically, the digital photo 400D is positioned behind the display window 402D such that a horizontal edge 410D of the digital photo 400D is aligned with a vertical midpoint 404D of the display window 402D. The vertical midpoint 404D is located halfway across a vertical axis Y of the display window 402D. Upon alignment of the horizontal edge 410D with the vertical midpoint 404D, the digital photo 400D is shifted along the vertical axis Y a total distance equal to 50% of a height $H_D$ of the digital photo 400D such that a vertical midpoint 414D of the digital photo 400D is horizontally centered within the display window 402D. For example, if the digital photo 400D has a height $H_D$ of 10, the digital photo 400D is vertically shifted in either a first or second direction $Y_1$ or $Y_2$, respectively, along the vertical axis Y by a distance of 5. The application of vertical centering behind the display window 402D may be performed alternatively or in combination with the horizontal centering described above with reference to FIG. 4C. In some embodiments, horizontal and vertical centering are performed simultaneously. Accordingly, prior to horizontal and vertical shifting of the digital photo, a top left corner of the digital photo will be positioned at the center of the display window. Thereafter, the digital photo may be horizontally shifted a distance equal to half of the digital photo's width and vertically shifted a distance equal to half of the digital photo's height.

Figure 5A:
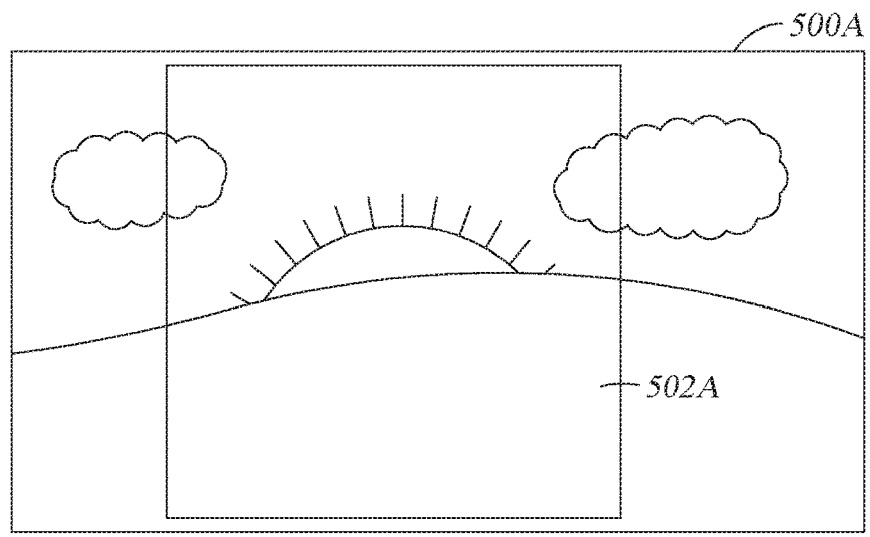
FIG. 5A illustrates a first conceptual diagram of applying a photo subject display to a digital photo, according to embodiments described herein.
Figure 5B:
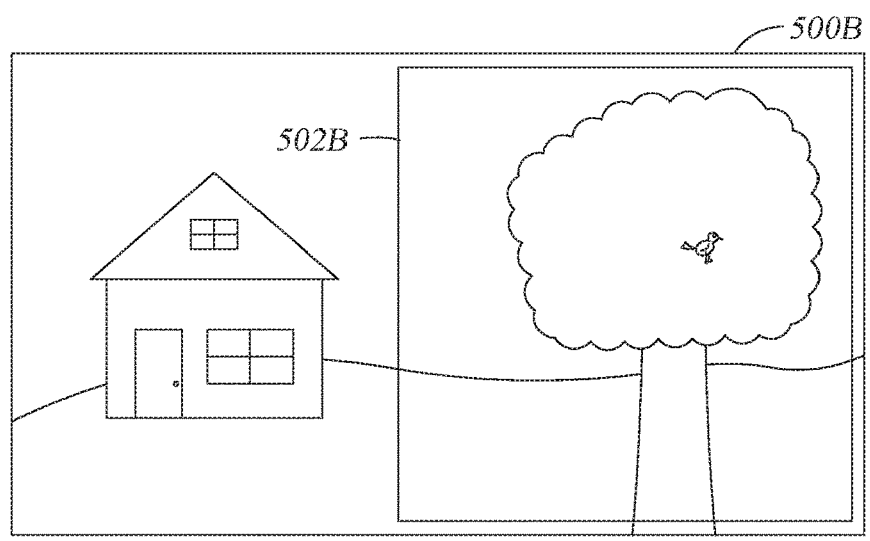
FIG. 5B illustrates a second conceptual diagram of applying a photo subject display to a digital photo, according to embodiments described herein.
Figure 5C:
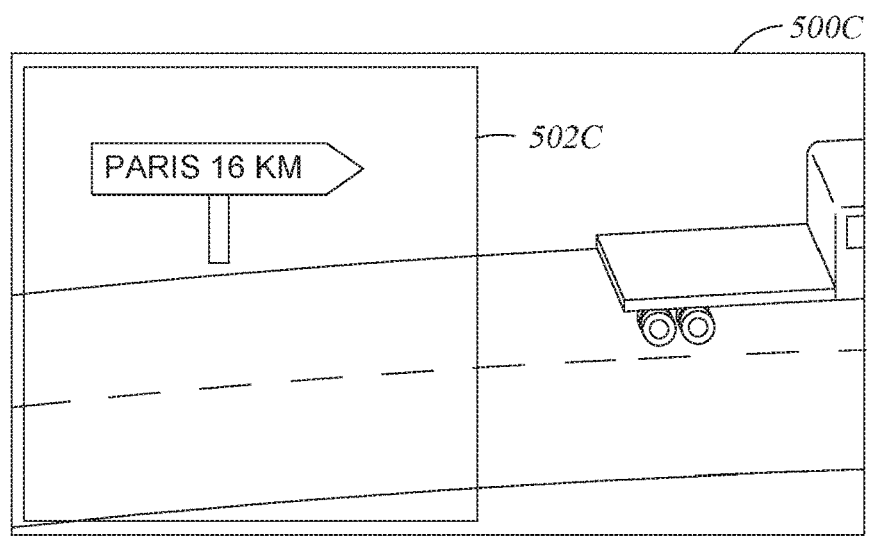
FIG. 5C illustrates a third conceptual diagram of applying a photo subject display to a digital photo, according to embodiments described herein.

FIGS. 5A, 5B, and 5C, respectively, are conceptual diagrams illustrating applications of a photo subject display to a digital photo 500A, 500B, 500C as uploaded to and received by the photo subject display application according to embodiments described herein.

In the embodiment illustrated in FIG. 5A, the photo subject display application 112 receives a selection of a gallery display scheme, as described with reference to FIG. 4A. As depicted in FIG. 5A, a square gallery display scheme has been selected by the user and a square display window 502A is shown in phantom over the digital photo 500A.

Moreover, digital photo 500A may maintain an aspect ratio different than that of the display window 502A. For example digital photo 500A may maintain an aspect ratio of 3:2, 7:5, etc.

The photo subject display application 112 may analyze the digital photo 500A in order to identify a photo subject of the digital photo 500A. The photo subject may be a primary object of a digital photo. Furthermore, the photo subject may be anywhere within the digital photo (e.g., top right corner, center, bottom left corner, etc.). In identifying the photo subject, the photo subject display application may extract shapes and shadows from within the photo and determine, via a comparison to known shapes, objects, landmarks, etc. stored within the photo subject display application 112, what the shape is. A ranking may be applied to each shape by determining object shapes within the digital photo, such that the shape scoring the highest rank has the most importance within the digital photo and is most likely to be the subject of the photo.

A photo subject area may be identified for each digital photo such that the photo subject area fully encompasses the shape identified as the photo subject of the digital photo. The identification of the photo subject and the photo subject area will be completed for each photo included within the image gallery. In the embodiment illustrated in FIG. 5A, a rising sun over a hill has been identified as the photo subject of the digital photo 500A. Furthermore, the photo subject area may comprise the full sun rise as seen in the digital photo 500A. As such, and based upon the selection of the square gallery display scheme of FIG. 5A, the photo subject display application 112 may display a square display window 502A—having an aspect ratio of 1:1—over the digital photo 500A. The photo subject area is further positioned by the photo subject display application 112 such that the entire photo subject area is within the display window 502A and wherein the photo subject area is displayed within the display window 502A regardless of the first aspect ratio of the display window 502A. Additionally, the photo subject display application 112 may further position the photo subject or the photo subject area toward a center or, alternatively, at the center, of the display window. However, it should be noted that it is not required that the photo subject area be centered within the display window, or even corrected such that the photo subject or photo subject area be repositioned toward the center of the display area. Centering the photo subject or photo subject area may assist, however, in maintaining a visually pleasing image gallery. Briefly turning to FIG. 6, the display window 502A of FIG. 5A is displayed in an image gallery 604 on a graphical user interface 600.

In the embodiment illustrated in FIG. 5B, the photo subject display application 112 receives a selection of a gallery display scheme. In the embodiment of FIG. 5B, as in the embodiment of FIG. 5A, a square gallery display scheme has been selected by the user (see FIG. 6), and, as such, a square display window 502B is shown in phantom over the digital photo 500B. Moreover, digital photo 500B may maintain an aspect ratio different than that of the display window 502B. For example digital photo 500B may maintain an aspect ratio of 3:2, 7:5, etc.

The photo subject display application 112 may analyze the digital photo 400B in order to identify a photo subject of the digital photo 500B. The identification of the photo subject and the photo subject area will be completed for each photo included within the image gallery 604. In the embodiment illustrated in FIG. 5B a bird resting in a tree has been identified as the photo subject of the digital photo 500B. Furthermore, the photo subject area may comprise the area immediately surrounding the bird as seen in the digital photo 500B. As such, and based upon the selection of the square gallery display scheme of FIG. 5B, the photo subject display application 112 may display a square display window 502B having an aspect ratio of 1:1, over the digital photo 500B. The photo subject area is further positioned by the photo subject display application 112 such that the entire photo subject area is within the display window 502B and wherein the photo subject area is displayed within the display window 502B regardless of the first aspect ratio of the display window 502B. Briefly turning to FIG. 6, the display window 502B of FIG. 5B is displayed in an image gallery 604 on a graphical user interface 600.

In the embodiment illustrated in FIG. 5C, the photo subject display application 112 receives a selection of a gallery display scheme. In the embodiment of FIG. 5C, as in the embodiment of FIGS. 5A and 5B, a square gallery display scheme has been selected by the user, and, as such, a square display window 502C is shown in phantom over the digital photo 500C. Moreover, digital photo 500C may maintain an aspect ratio different than that of the display window 502C. For example digital photo 500C may maintain an aspect ratio of 3:2, 7:5, etc.

The photo subject display application 112 may analyze the digital photo 500C in order to identify a photo subject of the digital photo 500C. The identification of the photo subject and the photo subject area will be completed for each photo included within the image gallery 604. In the embodiment illustrated in FIG. 5C, a road sign with text has been identified as the photo subject of the digital photo 500C. Furthermore, the photo subject area may comprise the area immediately surrounding the road sign as seen in the digital photo 500C. As such, and based upon the selection of the square gallery display scheme of FIG. 5C, the photo subject display application 112 may display a square display window 502C having an aspect ratio of 1:1, over the digital photo 500C. The photo subject area is further positioned by the photo subject display application 112 such that the entire photo subject area is within the display window 502C and wherein the photo subject area is displayed within the display window 502C regardless of the first aspect ratio of the display window 502C. Briefly turning to FIG. 6, the display window 502C of FIG. 5C is displayed in an image gallery 604 on a graphical user interface 600.

Figure 6:
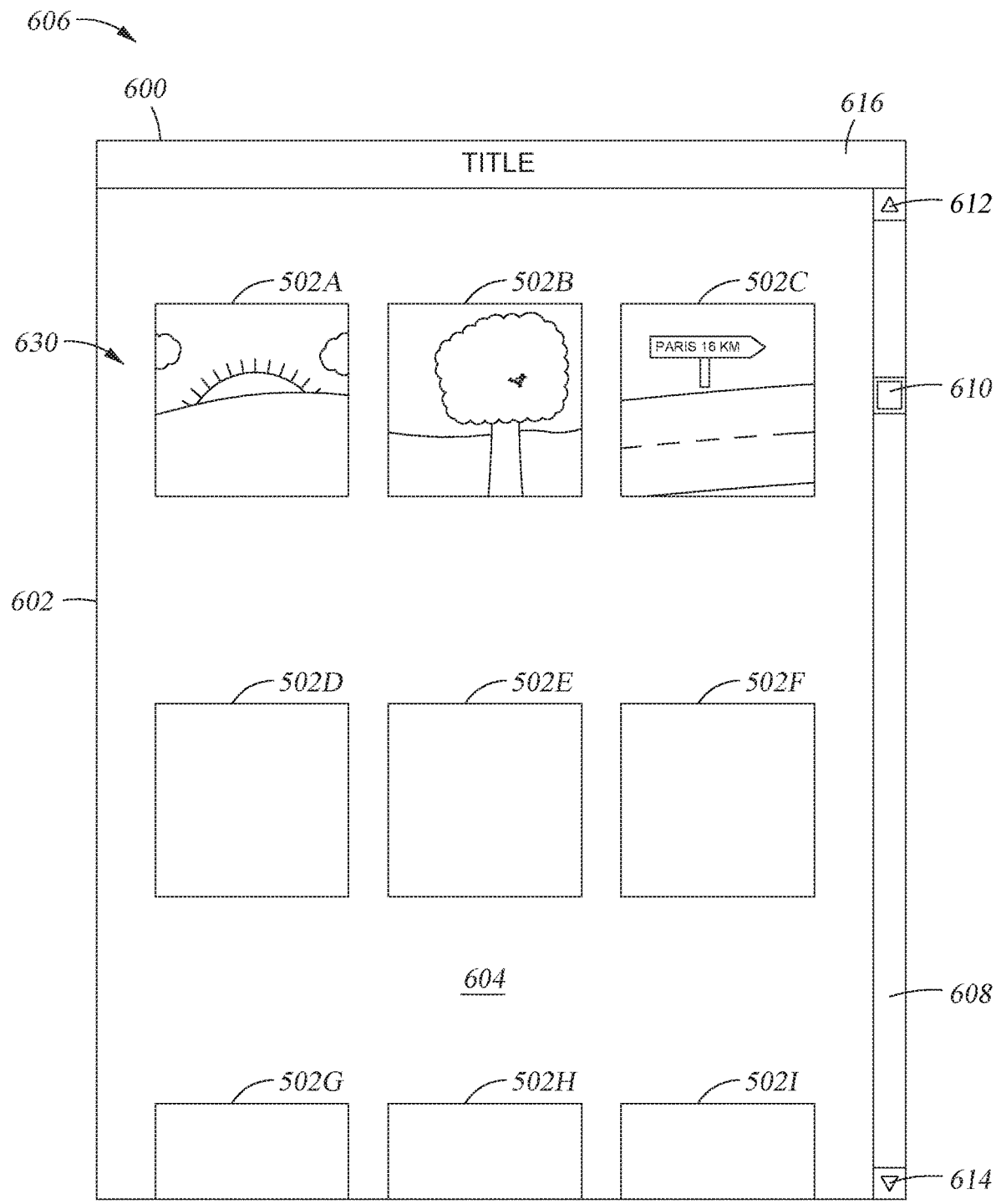
FIG. 6 illustrates a first conceptual diagram of applying a photo subject display to a user interface, according to embodiments described herein.

The graphical user interface 600 illustrated in FIG. 6 is accessible via a web browser application (not illustrated) and may include a plurality of web-based user interface elements, for example, a header, a footer, a body, borders, links, text blocks, and the like, which are arranged to present a digital photo gallery web page within the web browser application. For example, graphical user interface 600 may include a main window 602 that is configured to display the images contained within the image gallery 604. For example, the user interface 600 may be displayed to a user who is viewing a friend's photos via a photo gallery web page, or to a client who is viewing a professional photographer's photo gallery web page.

In the embodiment illustrated in FIG. 6, the user interface 600 displays a photo gallery web page 606 within the main window 602. The user interface 600 of the photo gallery web page 606 may be owned by an administrator user (e.g., a professional photographer) and viewed by a user (e.g., a client of the professional photographer). The main window 602 may contain a window scroll bar 608, a scroll location indicator 610, an up arrow 612, a down arrow 614, and a title bar 616. The photo gallery web page 606 as illustrated in FIG. 6 is configured to display rows of display windows, with each row containing three display windows. As shown, a first row 630 contains display windows 502A, 502B, and 502C. Further display windows 502 are also included.

As described above, a user may select a gallery display scheme. For example, the user can select a gallery display scheme comprising any number of display windows 502 in rows, columns, shapes, sizes, or locations within the main window 602 on the graphical user interface 600. The gallery display scheme may be selected from a pop-up window containing preprogrammed or predetermined gallery display schemes from which the user makes a selection, by typing in a gallery display scheme selection number, or any other suitable gallery display scheme selection techniques. In one embodiment, the selection of a gallery display scheme is made by the administrator user of the photo gallery web page who has identified the gallery display scheme chosen as being aesthetically pleasing based on the images contained within the photo gallery web page.

In one embodiment, after the web server 108 receives a selection of a gallery display scheme (not shown) as well as one or more digital photos (not shown) and before displaying the photo subject area within a display window 502 on the photo gallery web page 606, the photo subject display application 112 identifies and determines the photo subject for each digital photo received in the image gallery 604. Analysis identifying the photo subject of a digital photo performed by the photo subject display application 112 may search the pixels of the digital photo to ascertain the primary object of the digital photo. Every digital photo received by the photo subject display application 112 will have at least one photo subject identified. The photo subject may be a person, a face, an animal, a landmark, an object such as a flower or bicycle, a feature of an object, text, and the like. Furthermore, the photo subject may be a grouping of any of the above, such as a group of people, multiple people in front of a landmark, multiple animals, a field of flowers, an advertisement on a building, a sculpture, the edifice of a building, and the like.

In another embodiment, wherein more than one photo subject is identified within a digital photo, the more than one photo subjects may be included in the photo subject area. For example, if an image includes two birds each sitting on different tree branches of the same tree, both birds may be identified as a primary object of the digital photo. As such, both birds may be included within the photo subject area. Alternatively, only the first bird may be identified as the primary object of the digital photo, and, as such, the first bird may be the only subject included in the photo subject area. A photo subject area may include a single photo subject or multiple subjects as the primary object of the digital photo.

In identifying the photo subject the photo subject display application 112 may extract shapes, images, colors, shadows, patterns, etc. from the pixels within the photo. Analysis is performed on the extracted shapes, images, colors, shadows, patterns, etc. in order to identify the shape, image, color, shadow, pattern, etc. A comparison may be employed in order to evaluate the identification made against known shapes, images, colors, shadows, patterns, etc. stored within the photo subject display application 112. A ranking may be applied to each extracted shape, image, color, shadow, pattern, etc. such that the extracted item scoring the highest rank has the most importance within the digital photo and is determined to be the most likely photo subject of the photo. For example, a digital photo may comprise a person posing in front of a landmark. The person and the landmark may all be identified as the photo subject. However, in one embodiment the person may score a higher rank than the landmark. As such, the person may be identified as the highest scoring photo subject and, subsequently, be identified as the photo subject. Alternatively, in another embodiment, the person and the landmark may score the same rank. As such, the person and the landmark may be identified as the photo subject. Alternatively, in another embodiment, a digital photo may comprise an image of the same color, e.g., a solid blue sky. Each pixel within the digital photo may rank the same, and as such the entire photo may be the photo subject area, or, alternatively, only a portion of the photo may comprise the photo subject area as the entire photo ranked equally.

A photo subject area may subsequently be identified for each digital photo such that the photo subject area fully encompasses the identified photo subject of the digital photo, as identified above. The photo subject display application 112 may select a cohesive region (not shown) encompassing all identified photo subjects. The cohesive region may not be visible to a user. Furthermore, the cohesive region may be of any shape, such as a square or rectangle. The cohesive region comprising the photo subject may be the photo subject area. The identification of the photo subject and the photo subject area will be completed for each photo included within the image gallery.

As illustrated in FIG. 6 an administrator user, such as a professional photographer, has selected a gallery display scheme for an image gallery 604 comprising nine display windows 502A-502I, displayed in three rows with each row containing three display windows 502. Each display window selected has been configured to have an aspect ratio of 1:1, and as such the display windows 502A-502I are represented by a square shape within the main window 602 of the image gallery 604. Despite the aspect ratio of the photos received by the photo subject display application 112, the identified photo subject area and the identified photo subject(s) will be displayed within the display windows 502A-502I, with each display window 502A-502I displaying the photo subject area of one digital photo.

Figure 7A:
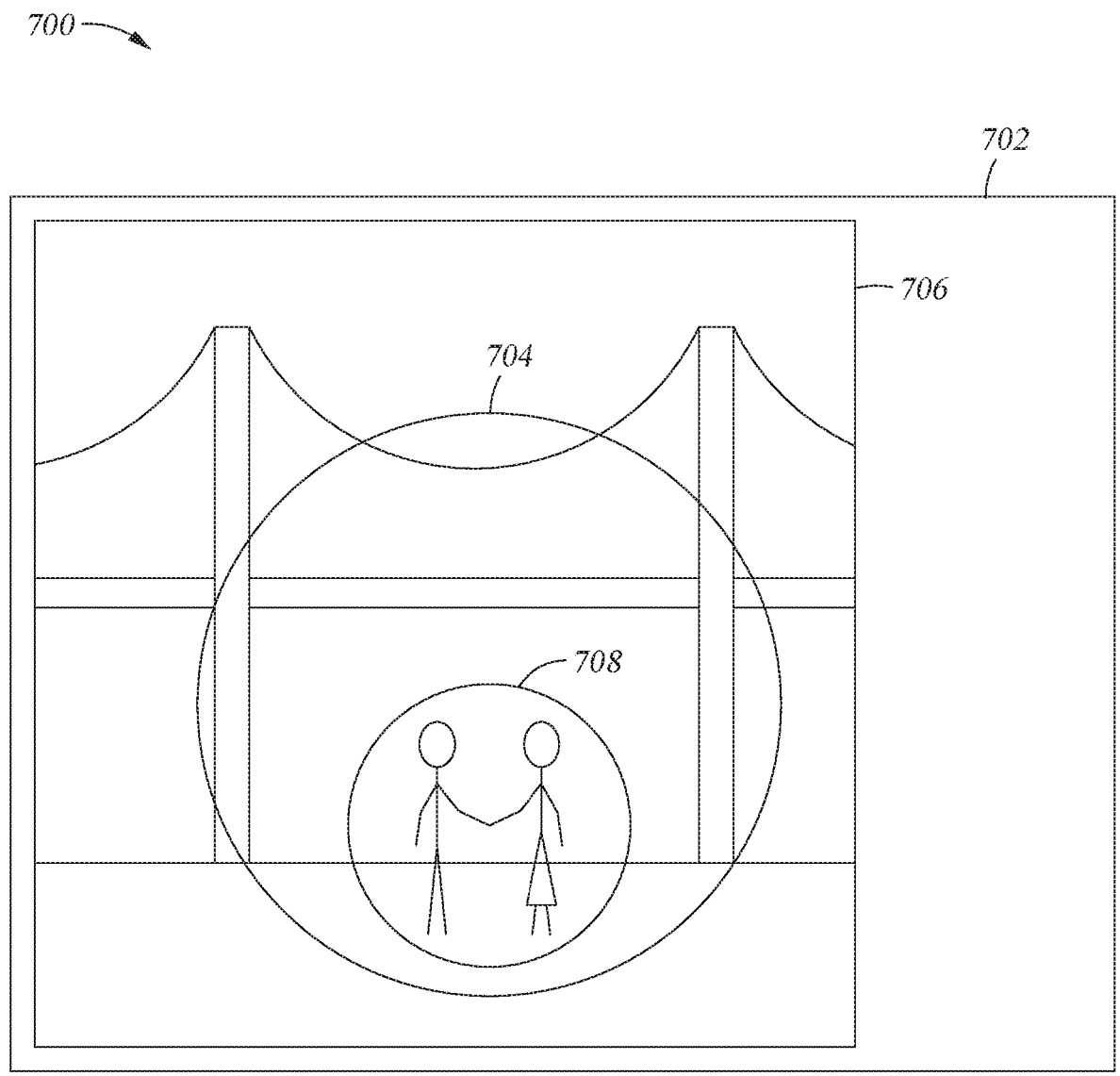
FIG. 7A illustrates a fourth conceptual diagram of applying a photo subject display to digital photo, according to embodiments described herein.

FIG. 7A illustrates another embodiment of the photo subject display application 112 as shown on a graphical user interface 700. In FIG. 7A a selection of a gallery display scheme has been received by the photo subject display application. In this embodiment, a circular gallery display scheme has been received and is displayed within a main window 702 of the graphical user interface 700. As such, a circular display window 704 has been created and displayed (in phantom) over a digital photo 706 received by the photo subject display application 112 for display in an image gallery 712 (See FIG. 7B). The photo subject display application 112 has identified the photo subject of the digital photo 706 as being two people. As such, a photo subject area 708 has been created (in phantom) by the photo subject display application 112 to surround the photo subject (the two people) of the digital photo 706, however the photo subject area 708 is not visible to a user as it is internal to the photo subject display application 112.

Figure 7B:
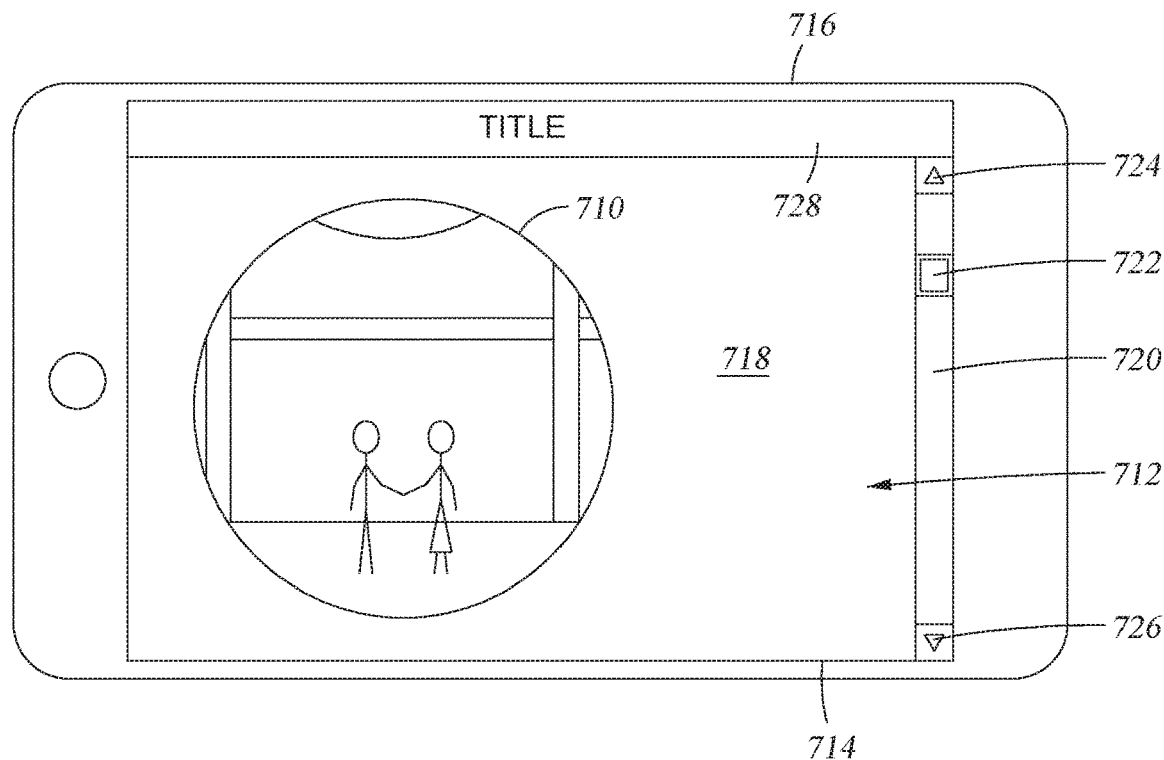
FIG. 7B illustrates a second conceptual diagram of applying a photo subject display to a user interface, according to embodiments described herein.

Turning to FIG. 7B, the photo subject area 708 may be positioned within the circular display window 704 and the circular display window 704 may be positioned within a display window 710 within a main window 718 of an image gallery 712 on a photo gallery web page 714 as displayed to a user on a graphical user interface 716. As stated above, the photo gallery web page 714 may include a main window 718 containing a window scroll bar 720, a scroll location indicator 722, an up arrow 724, a down arrow 726, and a title bar 728. The photo gallery web page 714, as illustrated in FIG.

7B, is configured to display a column of display windows, with each column containing one display window.

In the event that an administrator user of the photo gallery web page 714 (e.g., a professional photographer) is unsatisfied with photo subject area selected by the photo subject display application 112, or in the event that the photo subject display application 112 has selected the incorrect photo subject area, or if a different photo subject area is preferred, the photo subject display application 112 allows for a manual selection of a photo subject area to be displayed through a display window within the a main window of an image gallery.

Figure 7C:
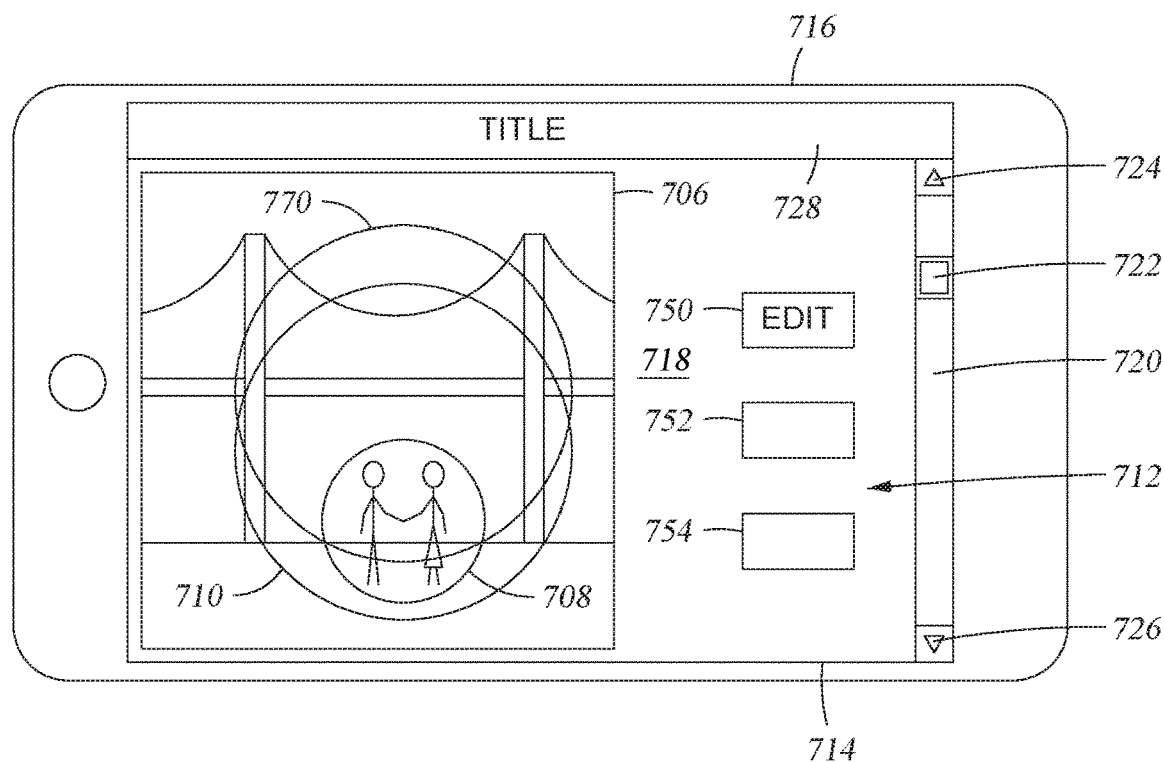
FIG. 7C illustrates another embodiment of the conceptual diagram of FIG. 6B, wherein a photo subject display correction is applied to a digital photo on a user interface, according to embodiments described herein.

FIG. 7C illustrates the embodiment of FIG. 7B wherein an administrator user desires to correct the photo subject area 708 of the digital photo 706. As illustrated in FIG. 7C, the digital photo 706 as uploaded to the photo subject display application 112 is shown in phantom, however a circular display window 710 containing the photo subject area 708 as previously identified by the photo subject display application 112 is shown positioned within a main window 718 of an image gallery 712 on a photo gallery web page 714 as displayed to a user on a graphical user interface 716. However, in the embodiment of FIG. 7C, the administrator user desires to change the portion of the digital photo 706 displayed within the circular display window 710. Rather than displaying the photo subject area 608 as identified by the photo subject display application 112, the administrator user may override the photo subject display application's 112 identification through the use of photo editing tools 750, 752, 754, or options, e.g., an edit button, provided by the photo subject display application 112 and displayed within the photo gallery web page 714 for manually editing the display windows. Upon activation of a photo editing tool or an option by an administrator user the administrator user may manually move, for example via the use of a click and drag operation of a mouse, display window from a first location to a second location. As illustrated in FIG. 7C, the administrator user has selected a second display window 760 as the desired display window to be positioned around a photo subject of the digital photo 706. As such, the second display window 760 is displayed within the main window 718 of the image gallery 712 on a photo gallery web page 714 as displayed to a user on a graphical user interface 716.

FIG. 8 schematically illustrates operations of a method 700 for photo subject display of a photo subject as displayed in an image gallery according to one embodiment described herein. The method 800 generally relates to embodiments wherein digital photos comprising photo subjects are displayed within a display window on a photo gallery web page and viewed by a user on a graphical user interface. Based on an identification of a photo subject and a photo subject area performed as soon as a photo is received by the photo subject display application 112, the photo subject display application 112 may ensure that the primary subject of a digital photo is displayed within a display window of an image gallery without regard to the aspect ratio of the photo or the display window. At operation 810, a selection of a gallery display scheme is received wherein the gallery display scheme comprises one or more display windows, each display window comprising one or more first aspect ratios. The gallery display scheme is made by an administrator user, generally the owner of the photo gallery web page (e.g., a photographer). At operation 820, one or more digital photos having one or more second aspect ratios are received. The one or more digital photos may be uploaded by the administrator user to a photo gallery web page which contains the photo subject display application 112.

At operation 830, a photo subject for each digital photo is identified. At operation 840 a photo subject area for each digital photo is identified as defined by the photo subject of each digital photo. At operation 850 the photo subject area of each digital photo is positioned within the one or more display windows such that each display window displays the photo subject of one digital photo, and wherein the photo subject area is displayed within the display window regardless of the one or more first aspect ratios. Each display window may display the photo subject area of one digital photo. At operation 860 the display windows are displayed in a gallery on a graphical user interface.

The photo subject display application creates an enhanced display of an online image gallery in order to improve the viewing experience of a user on a graphical user interface. Each image displayed may benefit individually or as a gallery from a tailored display scheme of the image(s), such that the image gallery remains aesthetically pleasing and consistently displays the photo subject of each digital photo, as images are displayed within the main window of the online image gallery.

While the foregoing is directed to embodiments described herein, other and further embodiments may be devised without departing from the basic scope thereof. For example, aspects of the present disclosure may be implemented in hardware or software or in a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (for example, read-only memory devices within a computer such as CD-ROM disks readable by a CD-ROM drive, flash memory, ROM chips or any type of solid-state non-volatile semiconductor memory) on which information is permanently stored; and (ii) writable storage media (for example, floppy disks within a diskette drive or hard-disk drive or any type of solid-state random-access semiconductor memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto that are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed is:

1. A method for analyzing and applying a photo subject display to an image, the method comprising:
   receiving a selection of a gallery display scheme, wherein the gallery display scheme comprises one or more display windows each comprising one or more first aspect ratios;
   receiving one or more digital photos having one or more second aspect ratios;
   determining and adjusting one or more dimensions of the one or more display windows based on dimensions of the one or more digital photos, wherein a width of each display window is set to match a width of a corresponding digital photo, and a height of each display window is determined by factoring a corresponding first aspect ratio and width of the display window;

centering the digital photos within the one or more display windows, the one or more display windows overlaid on the digital photos, the digital photos further retaining the one or more second aspect ratios during centering;

upon adjusting the dimensions of the display windows and centering the digital photos, comparing one or more patterns and shapes within each digital photo to stored known patterns and shapes;

assigning a score to the one or more patterns and shapes based on the comparison to the stored known patterns and shapes;

identifying a photo subject of each digital photo, wherein the identified photo subject corresponds to a highest score based on the comparison to known patterns and shapes;

creating a photo subject area from a portion of each digital photo that surrounds the identified photo subject, wherein the photo subject area is a cohesive region that has a shape of the portion immediately surrounding the identified photo subject and is not visible within the display windows;

positioning an entirety of the photo subject area within the one or more display windows such that each display window displays the photo subject area of the corresponding digital photo, wherein the display windows are positioned within a main image gallery window, and wherein the photo subject area is entirely displayed within the display window regardless of the one or more first aspect ratios; and displaying the display windows within the main image gallery window of the selected gallery display scheme on a screen of a display output device.

2. The method of claim 1, wherein the photo subject area is positioned toward a center of the display window.

3. The method of claim 2, wherein the photo subject area is not centered within the display window.

4. The method of claim 1, wherein the first aspect ratio of the display window is less than or equal to the second aspect ratio of the digital photos.

5. The method of claim 1, wherein a shape of the photo subject area corresponds to one of a square, rectangle, and circle.

6. The method of claim 1, wherein a shape of the display windows is the same as the shape of the photo subject area.

7. The method of claim 1, wherein digital photo editing tools are provided for manual editing of the photo subject area displayed within the one or more display windows, wherein the manual editing moves the display windows to a different position on the corresponding digital photo.

8. The method of claim 1, wherein the stored known patterns and shapes are stored in a photo display application and correspond to at least one of known persons, animals, objects, landmarks, and text.

9. The method of claim 1, wherein a plurality of photo subjects is identified in at least one of the digital photos, and further comprising selecting the cohesive region that encompasses the identified plurality of photo subjects as the photo subject area.

10. The method of claim 1, wherein the pattern extends an entirety of at least one of the digital photos, and further comprising the entirety of the at least one digital photo as a photo subject area.

11. The method of claim 1, wherein a plurality of photo subjects is identified in at least one of the digital photos, the plurality of photo subject including a person and a landmark.

12. A system for analyzing and applying a photo subject display to an image, the system comprising:

a user interface that receives a selection of a gallery display scheme, wherein the gallery display scheme comprises one or more display windows each comprising one or more first aspect ratios;

a communication interface that receives one or more digital photos having one or more second aspect ratios;

a processor that executes instructions stored in memory, wherein the processor executes the instructions to:

determine and adjust one or more dimensions of the one or more digital photos, wherein a width of each display window is set to match a width of a corresponding digital photo, and a height of each display window is determined by factoring a corresponding first aspect ratio and width of the display window;

center the digital photos within the one or more display windows, the one or more display windows overlaid on the digital photos, the digital photos further retaining the one or more second aspect ratios during centering;

upon adjusting the dimensions of the display windows and centering the digital photos, compare one or more patterns and shapes within each digital photo to stored known patterns and shapes;

assign a score to the one or more patterns and shapes based on the comparison to the stored known patterns and shapes;

identify a photo subject of each digital photo, wherein the identified photo subject corresponds to a highest score based on the comparison to known patterns and shapes;

create a photo subject area within each digital photo that surrounds the identified photo subject, wherein the photo subject area is a cohesive region that has a shape of a portion immediately surrounding the identified photo subject and is not visible within the display windows; and position an entirety of the photo subject area within the one or more display windows such that each display window displays the photo subject area of the corresponding digital photo, wherein the display windows are positioned within a main image gallery window, and wherein the photo subject area is entirely displayed within the display window regardless of the one or more first aspect ratios; and a display output device that displays the display windows within the main image gallery window of the selected gallery display scheme on a screen of the display output device.

13. The system of claim 12, wherein the photo subject area is positioned toward a center of the display window.

14. The system of claim 13, wherein the photo subject area is not centered within the display window.

15. The system of claim 12, wherein the first aspect ratio of the display window is less than or equal to the second aspect ratio of the digital photos.

16. The system of claim 12, wherein a shape of the photo subject area corresponds to one of a square, rectangle, and circle.

17. The system of claim 12, wherein a shape of the display windows is the same as the shape of the photo subject area.

18. The system of claim 12, wherein digital photo editing tools are provided for manual editing of the photo subject area displayed within the one or more display windows, wherein the manual editing moves the display windows to a different position on the corresponding digital photo.

19. A non-transitory computer-readable storage medium having instructions embodied thereon, the instructions executable by a processor to perform a method of analyzing and applying a photo subject display to an image, the method comprising:

receiving a selection of a gallery display scheme, wherein the gallery display scheme comprises one or more display windows each comprising one or more first aspect ratios;

receiving one or more digital photos having one or more second aspect ratios;

determining and adjusting one or more dimensions of the one or more display windows based on dimensions of the one or more digital photos, wherein a width of each display window is set to match a width of a corresponding digital photo, and a height of each display window is determined by factoring a corresponding first aspect ratio and width of the display window;

centering the digital photos within the one or more display windows, the one or more display windows overlaid on the digital photos, the digital photos further retaining the one or more second aspect ratios during centering;

upon adjusting the dimensions of the display windows and centering the digital photos, comparing one or more patterns and shapes within each digital photo to stored known patterns and shapes;

assigning a score to the one or more patterns and shapes based on the comparison to the stored known patterns and shapes;

identifying a photo subject of each digital photo, wherein the identified photo subject corresponds to a highest score based on the comparison to known patterns and shapes;

creating a photo subject area within each digital photo that surrounds the identified photo subject, wherein the photo subject area is a cohesive region that has a shape of a portion immediately surrounding the identified photo subject and is not visible within the display windows;

positioning an entirety of the photo subject area within the one or more display windows such that each display window displays the photo subject area of the corresponding digital photo, wherein the display windows are positioned within a main image gallery window, and wherein the photo subject area is entirely displayed within the display window regardless of the one or more first aspect ratios; and displaying the display windows within the main image gallery window of the selected gallery display scheme on a screen of a display output device.

* * * * *